(12) United States Patent
Bae

(10) Patent No.: US 9,967,263 B2
(45) Date of Patent: May 8, 2018

(54) FILE SECURITY MANAGEMENT APPARATUS AND MANAGEMENT METHOD FOR SYSTEM PROTECTION

(71) Applicant: SOFTCAMP CO., LTD., Seoul (KR)

(72) Inventor: Steve Bae, Gyeonggi-do (KR)

(73) Assignee: SOFTCAMP CO., LTD., Seoul (KR)

( * ) Notice: Subject to any disclaimer, the term of this patent is extended or adjusted under 35 U.S.C. 154(b) by 79 days.

(21) Appl. No.: 14/897,861

(22) PCT Filed: May 22, 2014

(86) PCT No.: PCT/KR2014/004577
§ 371 (c)(1),
(2) Date: Dec. 11, 2015

(87) PCT Pub. No.: WO2014/200201
PCT Pub. Date: Dec. 18, 2014

(65) Prior Publication Data
US 2016/0112441 A1 Apr. 21, 2016

(30) Foreign Application Priority Data
Jun. 12, 2013 (KR) ........................ 10-2013-0067267

(51) Int. Cl.
*G06F 21/00* (2013.01)
*H04L 29/06* (2006.01)
(Continued)

(52) U.S. Cl.
CPC .... *H04L 63/1408* (2013.01); *G06F 17/30914* (2013.01); *G06F 21/70* (2013.01)

(58) Field of Classification Search
CPC . H04L 63/1408; G06F 17/30914; G06F 21/70
See application file for complete search history.

(56) References Cited

U.S. PATENT DOCUMENTS

| 2007/0214369 A1* | 9/2007 | Roberts | G06F 21/79 713/192 |
| 2010/0023751 A1* | 1/2010 | He | H04L 63/0428 713/150 |
| 2012/0159232 A1* | 6/2012 | Shimada | G06F 11/1662 714/3 |

FOREIGN PATENT DOCUMENTS

| KR | 1020100030875 | 3/2010 |
| KR | 1020110004138 | 1/2011 |

(Continued)

*Primary Examiner* — Ghodrat Jamshidi
(74) *Attorney, Agent, or Firm* — IPLA P.A.; James E. Bame

(57) ABSTRACT

A file security management apparatus and method which protect various types of systems for executing files, entering from the outside, from malicious code, and which prevent data from being divulged from the systems and also prevent the systems from operating erroneously, thereby ultimately protecting the systems. The file security management apparatus includes a conversion module configured to convert an incoming file, received by a system, into a monitoring target file; a search module configured to identify a selection for the execution of the monitoring target file, and to output incoming files, configured in the monitoring target file, into a search window; and a security module configured to decrypt the monitoring target file to the incoming file, and to perform processing so that the incoming file is executed via a corresponding application program in an isolated drive set as an isolated environment.

2 Claims, 7 Drawing Sheets

(51) Int. Cl.
*G06F 21/70* (2013.01)
*G06F 17/30* (2006.01)

(56) References Cited

FOREIGN PATENT DOCUMENTS

KR 1020110132787 12/2011
KR 1020120116234 10/2012

\* cited by examiner

FILE SECURITY MANAGEMENT APPARATUS AND MANAGEMENT METHOD FOR SYSTEM PROTECTION

BACKGROUND

The present invention relates generally to a file security management apparatus and method which protect various types of systems for executing files, entering from the outside, from malicious code, and which prevent data from being divulged from the systems and also prevent the systems from operating erroneously, thereby ultimately protecting the systems.

With the development of data processing systems, such as computers, mobile terminals or the like, which operate and manage various types of data, and with the development of communication networks, such as the Internet, which mediate intercommunication, massive amounts of data are being handled via data processing systems.

Such data include information harmful to users as well as information beneficial to users. Examples of information harmful to users may include malicious code, such as a computer virus, spy-ware, ad-ware, etc. The malicious code may cause serious damage to a data processing system that is used by a plurality of specified or unspecified users, may cause a user to perform an undesirable operation, or may divulge the private information of a user and thus cause economic damage to the corresponding user. Accordingly, attempts have been continuously made to monitor and block such malicious code.

Conventionally and generally, to search for malicious code, the patterns of malicious code are stored in a database (DB) in advance, and then it is monitored whether a file having any one of the corresponding patterns is present at a specific location of a designated data processing system or network.

However, the conventional method is problematic in that the degree of security for invested time and resources is low because stored files are randomly selected and compared with the patterns stored in the DB. Furthermore, the conventional method is limited in that a conventional security apparatus cannot monitor malicious code that is not activated or is not malicious code itself at a specific time and then initiates a malicious function when processing is performed or a specific time is reached because the degree of security of a corresponding file is randomly monitored only at the time at which the conventional security apparatus operates, regardless of the execution of a file. Furthermore, the conventional method is also limited in that execution may have been completed before the inspection of a file because inspection is performed after an inspection target file has entered a system. That is, in the case where an inspection target file is a file infected with malicious code, a problem is incurred by the malicious code, although the corresponding system is equipped with the security apparatus based on the conventional method.

In order to overcome these problems, a method was proposed in which a conventional security apparatus inspected all files present in a data processing system or at specific locations at regular intervals. However, this method is problematic in that the conventional security apparatus needs to have high-level specifications in order to perform precise file monitoring because the number of security target files that need to be monitored by the conventional security apparatus is potentially massive, depending on the size of the data processing system or the number of specific locations, and the number of times monitoring is performed increases as the inspection interval decreases. Furthermore, this method is limited in that the problem in which an inspection target file may have entered the system and may have been executed is still not solved.

SUMMARY OF THE INVENTION

Accordingly, the present invention has been devised to overcome the above-described problems, and an object of the present invention is to provide a file security management apparatus and method for the protection of a system, which can prevent a harmful influence from being exerted on a file entering from the outside when the file is executed, and which can efficiently prevent problems, such as the erroneous operation of a system, the divulgence of data, etc., from occurring while monitoring problematic files in an integrated manner.

In order to accomplish the above object, the present invention provides a file security management apparatus for protection of a system, including:

a conversion module configured to convert an incoming file, received by a system, into a monitoring target file;

a search module configured to identify a selection for the execution of the monitoring target file, and to output incoming files, configured in the monitoring target file, into a search window; and a security module configured to decrypt the monitoring target file to the incoming file, and to perform processing so that the incoming file is executed via a corresponding application program in an isolated drive set as an isolated environment.

In order to accomplish the above object, the present invention provides a file security management method for protection of a system, including:

a search window output step of identifying, by a management apparatus, the execution of a monitoring target file, and outputting, by the management apparatus, an incoming file list of the monitoring target file into a search window; and an incoming file execution step of decrypting, by the management apparatus, the monitoring target file, output into the search window, to the incoming file, and performing, by the management apparatus, processing so that the incoming file is executed in an isolated drive set as an isolated environment.

The present invention has the effect of improving malicious code monitoring efficiency and operating efficiency and the effect of minimizing the load of a system during a monitoring operation because a file security apparatus for monitoring the operation of malicious code included in an executable file is passively driven and operated during the execution of the executable file.

- Description of reference symbols -

Figure 1:
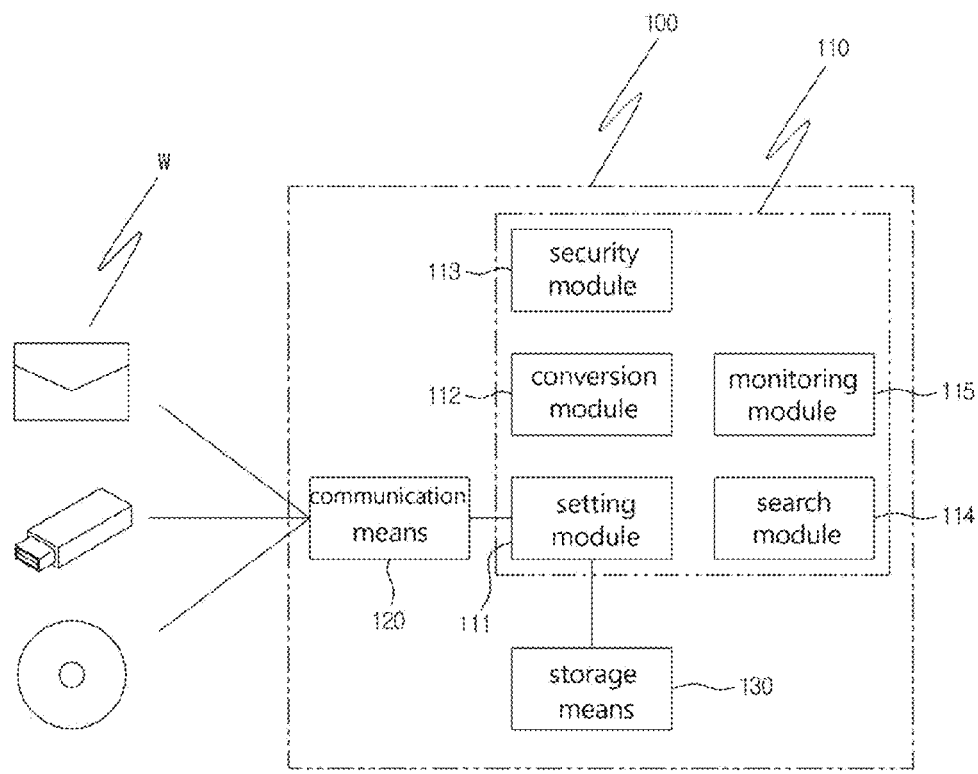
FIG. 1 is a block diagram showing the configuration of a system in which a management apparatus according to the present invention is constructed.

| | |
|---|---|
| 100 and 100': system | 110 and 110': management apparatus |
| 111: setting module | 112 and 112': conversion module |
| 113: security module | 114: search module |
| 115: monitoring module | 116: execution module |
| 120: communication means | 130: storage means |
| 140: OS    200: stub file | 210: stub |
| 220: header | 230: security loader |

DETAILED DESCRIPTION OF THE INVENTION

The features and effects of the above-described present invention will be more apparent from the following detailed description take in conjunction with the accompanying drawings, and, accordingly, those having ordinary knowledge in the technical field to which the present invention pertains can easily practice the technical spirit of the present invention. Although the present invention may be subjected to various modifications and various forms, specific embodiments will be illustrated in the drawings and will be described in the following description in detail. However, this is not intended to limit the present invention to specific disclosed forms, but it should be appreciated that the present invention includes all modifications, equivalents and substitutions included in the spirit and technical scope of the present invention. The terms used herein are used merely to describe specific embodiments, and are not intended to limit the present invention.

Specific content for practicing the present invention will be described in detail with reference to the accompanying drawings below.

Figure 2:
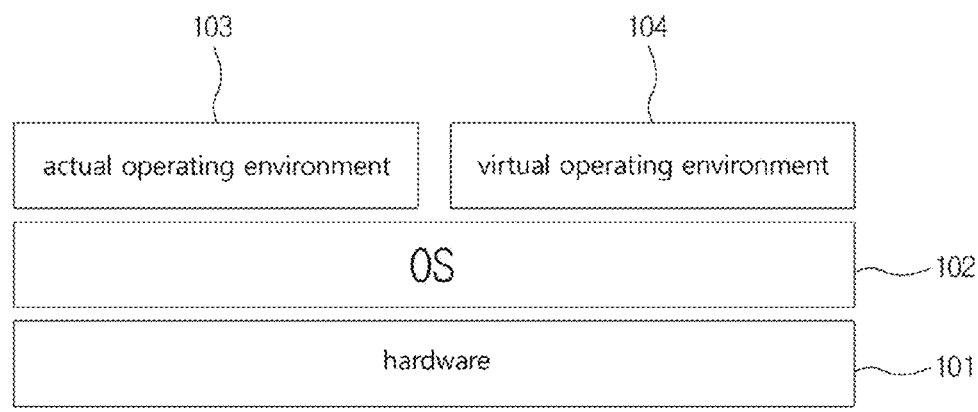
FIG. 2 is a diagram schematically showing the structure of a system for the configuration of the isolated environment of a management apparatus according to the present invention.

FIG. 1 is a block diagram showing the configuration of a system in which a management apparatus according to the present invention is constructed, and FIG. 2 is a diagram schematically showing the structure of a system for the configuration of the isolated environment of a management apparatus according to the present invention. The following description will be given with reference to these drawings.

A management apparatus 110 according to the present invention includes: a setting module 111 configured to check a file (hereinafter the "incoming file") entering from the outside of a system 100, and to set post-processing related to whether to perform monitoring; a conversion module 112 configured to convert an incoming file, set as a monitoring target, into a monitoring target file; a search module 114 configured to search for the incoming path W of the system 100, through which the incoming file enters, and an isolated drive, and to perform a search so that the monitoring target file stored in the isolated drive can be executed; a monitoring module 115 configured to perform processing so that the processing of the corresponding monitoring target file is performed in accordance with designated access authority information; and a security module 113 configured to decrypt the monitoring target file and to perform processing so that the decrypted incoming file is executed in the isolated drive, i.e., an isolated region, or in an artificially generated isolated environment.

The management apparatus 110 provides two operating environments, i.e., an actual operating environment 103 and a virtual operating environment 104 isolated from the actual operating environment 103, on an OS 102 in charge of the operation of a kernel area while communicating with the hardware 101 of the system 100. The actual operating environment 103 and the virtual operating environment 104 share the OS of the kernel area. The resources (disks, registries, etc.) of the actual operating environment 103 and the virtual operating environment 104 are separated by virtualization technology so that the resources do not interfere with each other, which may be implemented using general application virtualization technology.

The setting module 111 determines whether to set an incoming file, received by a communication means 120, as a monitoring target while operating in conjunction with the communication means 120 that processes the communication of the system 100. More specifically, system 100 includes the well-known, commonly used communication means 120 that processes an incoming path W for an external file, such as a web browser for executing e-mail or a messenger, a USB drive for reading and checking a USB external storage device and a CD drive for reading and checking a CD. The setting module 111 checks the incoming file, received by the communication means 120 from the incoming path W, and queries a user about a storage path for the incoming file while operating in conjunction with communication means 120. That is, whether to set the incoming file as a monitoring target is queried. When the user selects the incoming file as a monitoring target, a subsequent process is performed such that the incoming file is converted into a monitoring target file. It will be apparent that when the user sets the incoming file as a non-monitoring target in the query, the incoming file is stored on a path, designated by the user, without a change. In an embodiment according to the present invention, a setting is made such that the incoming file is converted such that the incoming file can be executed only in a limited isolated environment and the execution of the incoming file can be monitored. In this case, the incoming file is data initially entering the system 100, and a USB, a CD/DVD or the like is the incoming path W through which the incoming file enters the system 100. Accordingly, the management apparatus 110 according to the present invention recognizes a drive for the operation of a USB, a CD/DVD or the like as an isolated drive, and the search module 114 outputs a USB drive, a CD/DVD drive and/or the like as an isolated drive when a search window is output.

However, alternatively, the security management apparatus according to the present invention may convert the incoming file, entering via a USB drive, a CD/DVD drive and/or the like, into a monitoring target file without a separate query at one time, and may set all drives, such as a USB drive, a CD/DVD drive and/or the like, provided in the system 100, as the isolated drive.

Once the setting module 111 has made a setting so that the incoming file is to be converted into a monitoring target file, the conversion module 112 converts the incoming file into a file that can be executed only by a management apparatus-dedicated application, and stores the file in the incoming path W, such as a USB, a CD/DVD or the like, of a corresponding isolated drive or in a storage means 130 within the system 100. In this case, the corresponding file obtained by the conversion is classified as a monitoring target file, and the conversion may be performed via encryption. For reference, the storage means 130 collects one or more pieces of data as a single task unit, and compresses and stores the pieces of data in the form of a monitoring target file. The storage means 130 assigns monitoring target IDs to respective monitoring target files according to a setting, thereby enabling the monitoring target files to be clearly distinguished from other monitoring target files and also enabling security processing to be clearly performed. In this case, the monitoring target IDs are generated and classified for respective incoming paths for incoming files, and thus they may be managed by the monitoring module 115 in an integrated manner in case of emergency. That is, when malicious code is executed or an unauthorized operation is performed via the execution of a monitoring target file having a specific monitoring target ID, the monitoring module 115 may process the management of other monitoring target files having the same monitoring target ID in an integrated manner. For reference, the monitoring target IDs are distinct from file names that are used when incoming files or monitoring target files are directly named. The monitoring target IDs are criteria of distinction that are used by the management apparatus 110 to distinguish the incoming paths of incoming files, whereas the file names are criteria of distinction that are used by a user to distinguish files. Accordingly, it is sufficient if the monitoring target IDs are registered in the monitoring target files so that the management apparatus 110 can identify them. The monitoring target IDs may be indicated along with file names so that the user can identify files. However, it will be apparent that file names that are directly made by the user and assigned to monitoring target files may be used as the monitoring target IDs.

Meanwhile, the storage means 130 may encrypt the above-described data in the form of a single monitoring target file, and may store the single monitoring target file for each monitoring target ID. Accordingly, even when the data are illegitimately divulged, there is no case where the data are illegitimately executed and damage the system 100 because the data have been encrypted in the form of a monitoring target file.

When the user attempts the execution of the data, the security module 113 executes the virtual operating environment 104 (an isolated environment) separate from the actual operating environment 103. The virtual operating environment 104 is implemented using general virtualization technology, as described above, and provides a virtual desktop environment separate from the actual operating environment 103. Therefore, a change in OS system resources (disks, registries, services, etc.) attributable to the execution of the data by the user is applied only to the virtual operating environment 104 separate from the actual operating environment 103. More specifically, when the user attempts the execution of the data, the security module 113 determines whether the execution target data correspond to a monitoring target file, and virtualizes an operating environment (system resources, such as disks, registries, etc.) required by the system 100 to execute a target application if, as a result of the determination, it is determined that the data correspond to a monitoring target file. As well known, technology for converting an operating environment required by the system 100 includes saniboxie, chroot, Free BSD jails, Remote Desktop Services, etc. The security module 113 according to the present invention applies the technology for converting the operating environment of the system 100 to the virtualization processing for the execution of the monitoring target file. For reference, the virtualized operating environment for the execution of the monitoring target file according to the present invention prepares for a setting to an isolated environment in which the execution of the monitoring target file is limited to read-only system resources and in which the external communication of the corresponding application is entirely blocked.

Thereafter, the security module 113 allows the virtual operating environment 104 of the operating environment to be implemented in each drive unit. For this purpose, the security module 113 may generate an isolated environment by mounting a designated USB drive, CD/DVD drive, file, folder or the like on the isolated drive. As a result, the system 100 is reconfigured as an environment in which a process can be executed according to a mode set as a security environment, thereby enabling the execution of an authorized program for the execution of the monitoring target data to be performed in the designated isolated environment. For reference, in the case of a USB drive and a CD/DVD drive, the security module 113 is allowed to recognize the corresponding drive as the isolated drive and to set the USB drive and the CD/DVD drive as the incoming path W, thereby enabling the execution of the monitoring target file obtained through conversion to be applied to and executed only in the corresponding USB drive and CD/DVD drive and to be prevented from being applied to other local drives within the system 100.

As described above, the isolated drive is a file or device that is controlled by the security module 113 so that the execution of the incoming file can be limitedly performed within the range of the isolated environment. File data located in the isolated drive is all prevented from being divulged to the outside, thereby preventing the occurrence of a problem in the system 100 attributable to the corresponding data. For this purpose, the isolated drive is caught only by the normally executed management apparatus 110, and thus the user can identify the isolated drive via the legitimate execution of the management apparatus 110. Furthermore, the isolated drive is caught only by an authorized program, and thus the isolated drive may be identified when the user attempts an invocation function to an authorized program.

For reference, in an embodiment according to the present invention, the isolated drive independent may be present in the form of a general file in a normal situation, and may operate as a virtual drive and allow separate data (a monitoring target file) to be input and output when the management apparatus 110 operates to execute the monitoring target file. The monitoring target file may be encrypted and decrypted by the security module 113 during the input and output thereof, and thus the corresponding monitoring target file may be prevented from being divulged. Since technology regarding the isolated drive is disclosed in Korean Patent Nos. 0549644, 0589541 and 0596135 possessed by the applicant of the present invention, detailed descriptions of the structure and operating principle of the isolated drive are omitted.

Furthermore, the authorized program refers to an application that is configured to access the isolated drive. A setting is made such that a dedicated application can access the isolated drive when the user attempts the execution of the monitoring target file in order to execute an incoming file belonging to the monitoring target file. Thereafter, only the corresponding application may be allowed to process the incoming file. As a result, other applications (a malicious program, etc.) that have not been authorized to access the isolated drive may not be executed when the incoming file is executed. In an embodiment according to the present invention, a corresponding application is temporarily authorized to execute the incoming file and accesses the isolated drive, and the authorization is released when the execution of the incoming file is terminated. Since the authorization of a program (an application) is a precondition for operating in conjunction with the isolated drive, the security module 113 performs the authorization of the program and the determination of whether the program has been authorized.

Meanwhile, the isolated environment is an execution environment that is distinctive from a general environment configured when the system 100 is booted up, and limits the execution of the monitoring target file within a designated range. In this case, a drive that is driven in the isolated environment is an isolated drive, and data that is generated in the isolated environment is stored in the isolated drive. More specifically, an Operating System (OS) that is installed in the system 100 to execute data generates an environment in which a program is executed. Since a general conventional environment is vulnerable in terms of security, a security environment that forms a separate communication line while allowing only an authorized program to be executed is constructed in the system 100.

The security module 113 controls the isolated drive, performs the encryption of the incoming file and the decryption of the monitoring target file, and allows the incoming file to be stored in the isolated drive, i.e., an isolated environment mode. For reference, when a USB and a CD/DVD are not connected to a USB drive or a CD/DVD drive, there is no incoming file that enters the system 100, and thus the management apparatus 110 is not driven. Meanwhile, when the incoming file is stored in the system 100, the incoming file is converted into a monitoring target file as described above, and is encrypted using an extension that can be executed only by the management apparatus 110. For reference, in the present embodiment, the extension of the monitoring target file that is store in a non-isolated environment, i.e., a general drive within the storage means 130, is set to "*.vroom."

The security module 113 decrypts the corresponding monitoring target file into an incoming file and then stores the incoming file in the isolated drive, i.e., an isolated environment, so that the incoming file can be executed within a limited range. Accordingly, an authorized application program searches for the incoming file and performs "invocation" because the isolated drive is searched for, and an unauthorized application program may not search for the isolation target data because the isolated drive is not searched for.

The security module 113 may distinguish the execution environments of the system 100 into a general environment and an isolated environment, and thus may impose a limitation so that the execution of the incoming file is performed only in the isolated environment.

For reference, the isolated drive may be identified in the general environment, and a general drive contrasting with the isolated drive may be identified in the isolated environment in which the security module 113 is constructed. However, the security module 113 prevents the incoming file from being executed in a general drive both in the general environment and in the isolated environment.

Meanwhile, the management apparatus 110 according to the present invention may allow monitoring target files regarding a plurality of monitoring target IDs to be posted on a search window, and may allow the user to selectively execute the monitoring target files. In this case, the incoming files are classified according to their monitoring target ID and stored in the isolated environment. In order to prevent the information of the incoming files from being divulged, the execution of the incoming files is allowed to be executed one at a time for each monitoring target ID.

Figure 3:
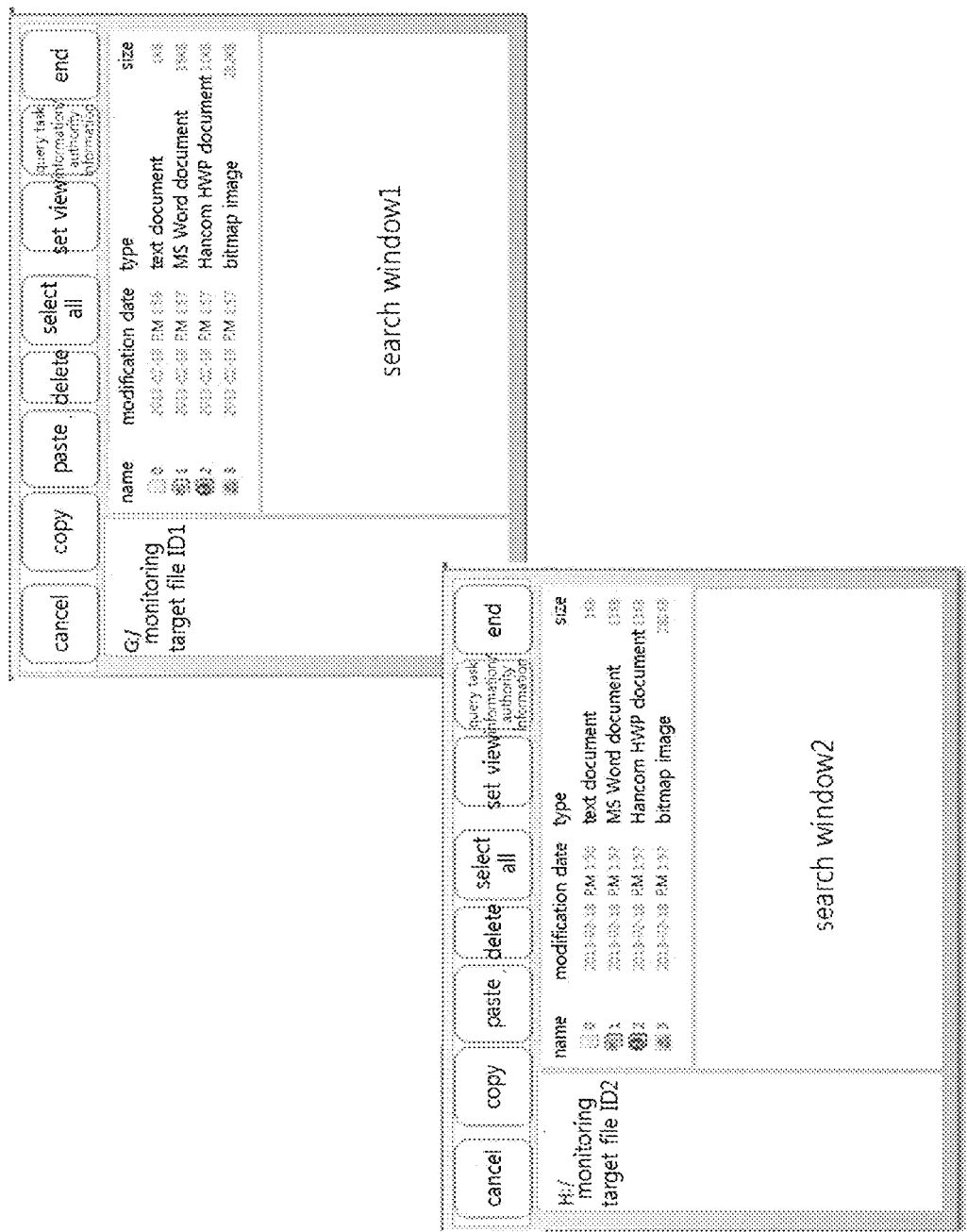
FIG. 3 is an image showing one embodiment of the search window that is operated by a management apparatus according to the present invention.

The search module 114 arranges and provides a list of the monitoring target files stored in the storage means 130 and a list of the incoming files configured in the monitoring target files. When the user checks a monitoring target file and attempts to execute the monitoring target file, the search module 114 is executed, and incoming files configured in the corresponding monitoring target file are output to the search window in the form of a list, as shown in FIG. 3 (an image showing one embodiment of the search window that is operated by the management apparatus according to the present invention). The user may check the incoming files included in the monitoring target file in the search window being output into the monitor of the system 100, and may select and execute a posted incoming file.

For reference, "0.txt," "1.word," "2.hwp" and "3.bmp" posted on search windows 1 and 2 are lists of incoming files that are posted in detail when the user clicks on corresponding monitoring target files (or monitoring target IDs). The lists illustrate incoming files that are executable via corresponding application programs. Although in the present example, examples of extensions include are illustrated as txt, docx, hwp and bmp, the extensions are not limited thereto. Additionally, general document files may include not only drawing and design data files but also executable files, such as *.exe and *.dll files.

Thereafter, the search module 114 outputs an indication of the isolated drive, where decrypted incoming files are located, into the task search window shown in FIG. 3, thereby enabling the user to control the execution of the incoming files in the isolated drive corresponding to an isolated environment. For reference, as shown in FIG. 3, a single task search window can be executed for each drive (G: drive, H: drive, or the like). When a monitoring target file in any isolated drive is being currently executed, the execution of another monitoring target file may be limited.

The monitoring module 115 checks incoming files within the monitoring target file of any monitoring target ID executed in the isolated environment, and detects whether malicious code configured in the incoming files is activated or unauthorized execution is performed. In an embodiment according to the present invention, the execution of the incoming file may limit a read function in the isolated environment. Accordingly, although an influence exerted on the system 100 by the operation of the incoming file is not great, an existing file may be executed by operating in conjunction with the incoming file and exert a harmful influence on the system 100. In order to provide for this, the monitoring module 115 checks the incoming file of the monitoring target file being executed in the isolated environment, and forcibly stop the execution or provides notification to the user by outputting a warning window in case of emergency. Furthermore, the monitoring module 115 may determine the monitoring target ID of the monitoring target file that has caused the problem, and may control the operation of the same monitoring target ID in an integrated manner so that the operation of the same monitoring target ID is limited. For reference, the monitoring module 115 that monitors the activity of malicious code employs well-known, commonly used vaccine program technology, and the corresponding technology includes technology that forcibly stops unauthorized execution or outputs a warning window when the unauthorized execution is detected.

Figure 4:
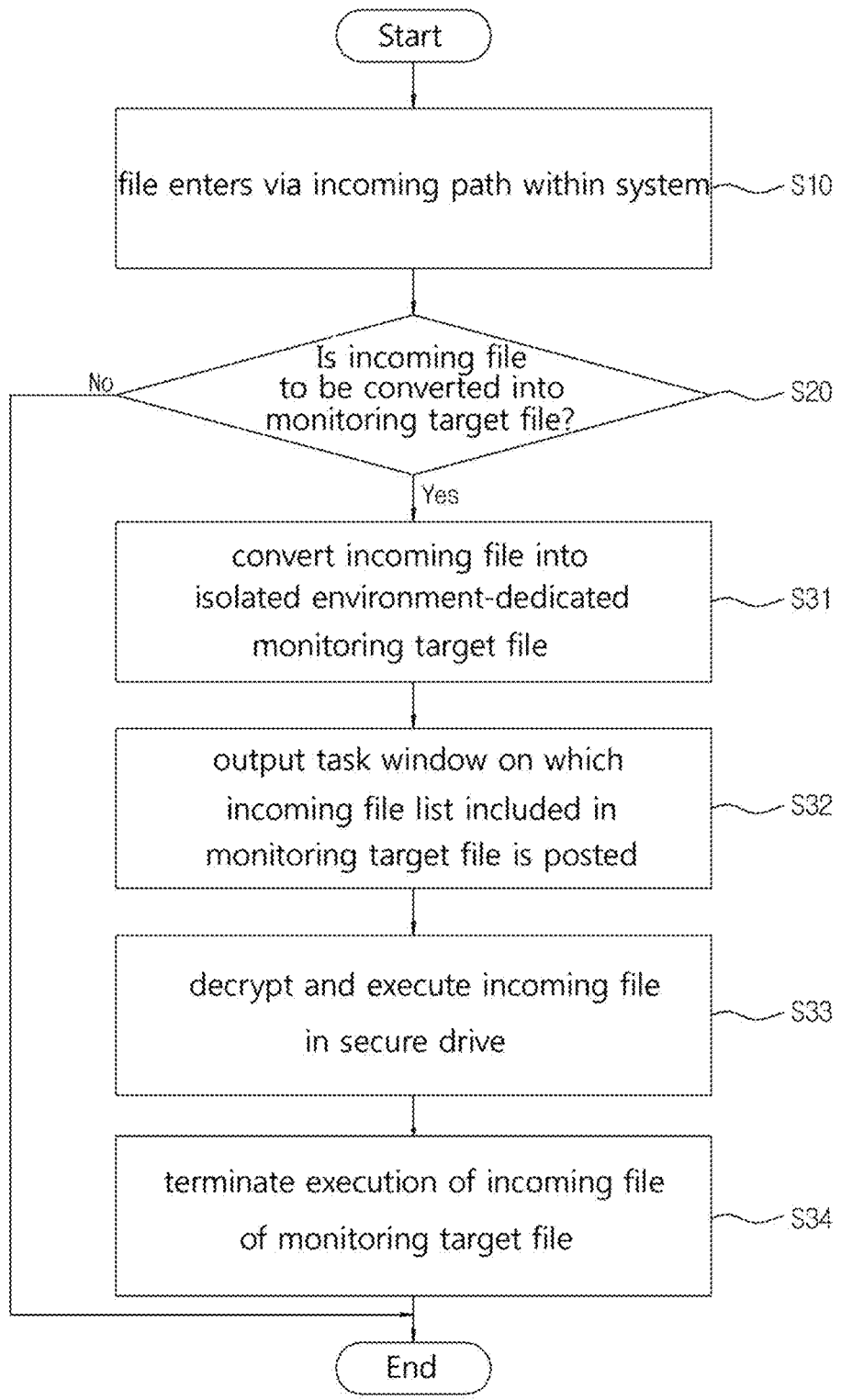
FIG. 4 is a flowchart sequentially showing a first embodiment of a management method according to the present invention.

FIG. 4 is a flowchart sequentially showing a first embodiment of a management method according to the present invention. The following description will be given with reference to this drawing.

S10: File Entrance Step

The communication means 120 constructed in the system 100 receives a file from the outside via the incoming path W, such as a web browser for executing e-mail or a messenger, a USB drive for reading and checking a USB external storage device and a CD drive for reading and checking a CD. The incoming file received as described above is processed via a well-known, widely used function by the communication means 120 of the system 100, a user is queried about a storage path and a file name, and the incoming file is stored at the designated location of the storage means 130. Files stored in the system 100 may be queried on a per-file basis or on a per-program basis. In the case where a query is made on a per-program basis, when the user inputs a storage path or the like, all files included in a corresponding program are input to the storage path at one time.

S20: Incoming File Setting Step

The system 100 according to the present invention includes the management apparatus 110, and the setting module 111 of the management apparatus 110 checks the incoming file received from the incoming path W while operating in conjunction with the communication means 120 of the communication means 120 and queries the user about the storage path of the incoming file. That is, whether to set the incoming file as a monitoring target is queried. When the user selects the incoming file as a monitoring target, a subsequent process is performed such that the incoming file is converted into a monitoring target file. It will be apparent that when the user sets the incoming file as a non-monitoring target in the query, the incoming file is stored on a path, designated by the user, without a change. In an embodiment according to the present invention, a setting is made such that the incoming file is converted such that the incoming file can be executed only in a limited isolated environment and the execution of the incoming file can be monitored.

Alternatively, as to whether to set the incoming file, entering the system 100 via a USB or a CD/DVD, as a monitoring target, the incoming file may be unconditionally set as a monitoring target without a separate query.

S31: Monitoring Target File Conversion Step

When the setting module 111 makes a setting so that the incoming file is converted into a monitoring target file, the conversion module 112 of the management apparatus 110 converts the incoming file into a file that can be executed or searched for only by the management apparatus, and stores the file in a USB within a USB drive, i.e., the corresponding incoming path W, or a CD/DVD within a CD/DVD drive, i.e., the corresponding incoming path W, or in the storage means 130 of the system 100. In this case, the corresponding file obtained by the conversion is classified as a monitoring target file, and the conversion may be performed via encryption. The file name of the monitoring target file may be designated by the user, and the storage location may be designated by the user. In an embodiment according to the present invention, the monitoring target file obtained by the conversion module 112 through the conversion is converted such that it is executed only in an isolated environment.

For reference, when the incoming path W of the incoming file is the communication means 120, such as a USB drive or a CD/DVD drive, the conversion module 112 according to the present invention may set an isolated environment (an isolated drive), in which the user executes the monitoring target file after converting the incoming file into the monitoring target file, to the USB drive or CD/DVD drive, i.e., the incoming path W of the corresponding incoming file. In contrast, when the incoming path W of the incoming file is the communication means 120, such as e-mail, the conversion module 112 according to the present invention may set an isolated environment (an isolated drive), in which the user executes the monitoring target file after converting the incoming file into the monitoring target file, to a separately generated file or folder. As a result, the conversion module 112 may set the isolated drive to the USB drive and/or CD/DVD drive or to the separate file or folder according to the incoming path W of the incoming file.

S32: Search Window Output Step

When the user executes the monitoring target file, the search module 114 outputs a search window on which a monitoring target file list including a corresponding monitoring target ID or file name is posted. In this case, the search window displays the isolated drive, i.e., an isolated environment in which the incoming file configured in the monitoring target file is executed, thereby enabling the user to become aware of a location at which the incoming file is temporarily stored and executed.

Thereafter, the search window outputs a list of incoming files included in the monitoring target file. Before the user makes a selection in order to limit the execution of the incoming file, only the list of incoming files may be posted.

S33: Incoming File Execution Step

When the user clicks on one of the incoming files posted on the search window in order to execute the incoming file, the security module 113 decrypts the encrypted monitoring target file into the incoming file, and stores the incoming file in the isolated drive, i.e., an isolated environment.

Thereafter, the incoming file stored in the isolated drive is executed via a corresponding application program. In this case, the application program may be an application program that is authorized to be executed in the isolated environment. The application program may recognize the isolated drive and then connect and execute the incoming file.

Meanwhile, during the execution of the incoming file, the monitoring module 115 determines whether malicious code is executed or unauthorized execution is performed by the incoming file in the isolated environment. Since the operation of the system 100 by the incoming file is limited within the range of the isolated environment, the monitoring module 115 may determine whether a problem attributable to the execution of the incoming file has occurred within the range of the isolated environment. It will be apparent that the incoming file infected with the malicious code is executed in the isolated environment in an isolated state, an influence is not exerted on the system 100.

If, as a result of the monitoring of the monitoring module 115, a problem attributable to the incoming file has occurred in the isolated environment, the execution of the incoming file may be stopped and a warning window may be output to the user. Furthermore, the incoming path W is identified by determining the monitoring target ID of the monitoring target file to which the incoming file belongs, and the execution of other monitoring target files belonging to the corresponding incoming path W may be limited at one time.

S34: Incoming File Execution Determination Step

Thereafter, the user completes a task, such as the execution, editing or the like of the incoming file, and then performs termination, such as the closing of the search window, together with the termination of the incoming file. For this purpose, when the user manipulates a termination menu in the search window, the security module 113 encrypts the incoming file located in the isolated drive, converts the encrypted incoming file into a monitoring target file on a per-task unit basis, and then stores the monitoring target file in a non-isolated environment within the storage means 130. For reference, when the incoming file within the isolated drive is converted into the monitoring target file, the file name of the corresponding monitoring target file is set to an existing file name and/or a monitoring target ID, thereby enabling the user to search for and decrypt the monitoring target file and then performing a task.

The security module 113 determines whether an application program has been authorized, and performs control so that only the authorized application program is executed in the isolated environment. When the user manipulates a "task termination menu," the corresponding incoming file is stored in the isolated drive, and the mounted isolated drive is unmounted. As an example, the USB drive and/or CD/DVD drive mounted on the isolated drive according to the present invention is removed simultaneously with the extinction of the search window, and the isolated drive generated as a file or folder may be deleted from a directory window. For reference, in an embodiment according to the present invention, the isolated drive may be set only to a USB drive and/or CD/DVD drive. As to the reception of an attached file, such as an e-mail or the like, an external incoming file may be received and stored using a method of performing storage in the system 100 through separate data authorization in terms of policies without the generation of an isolated drive using a separate file, a folder or the like.

Figure 5:
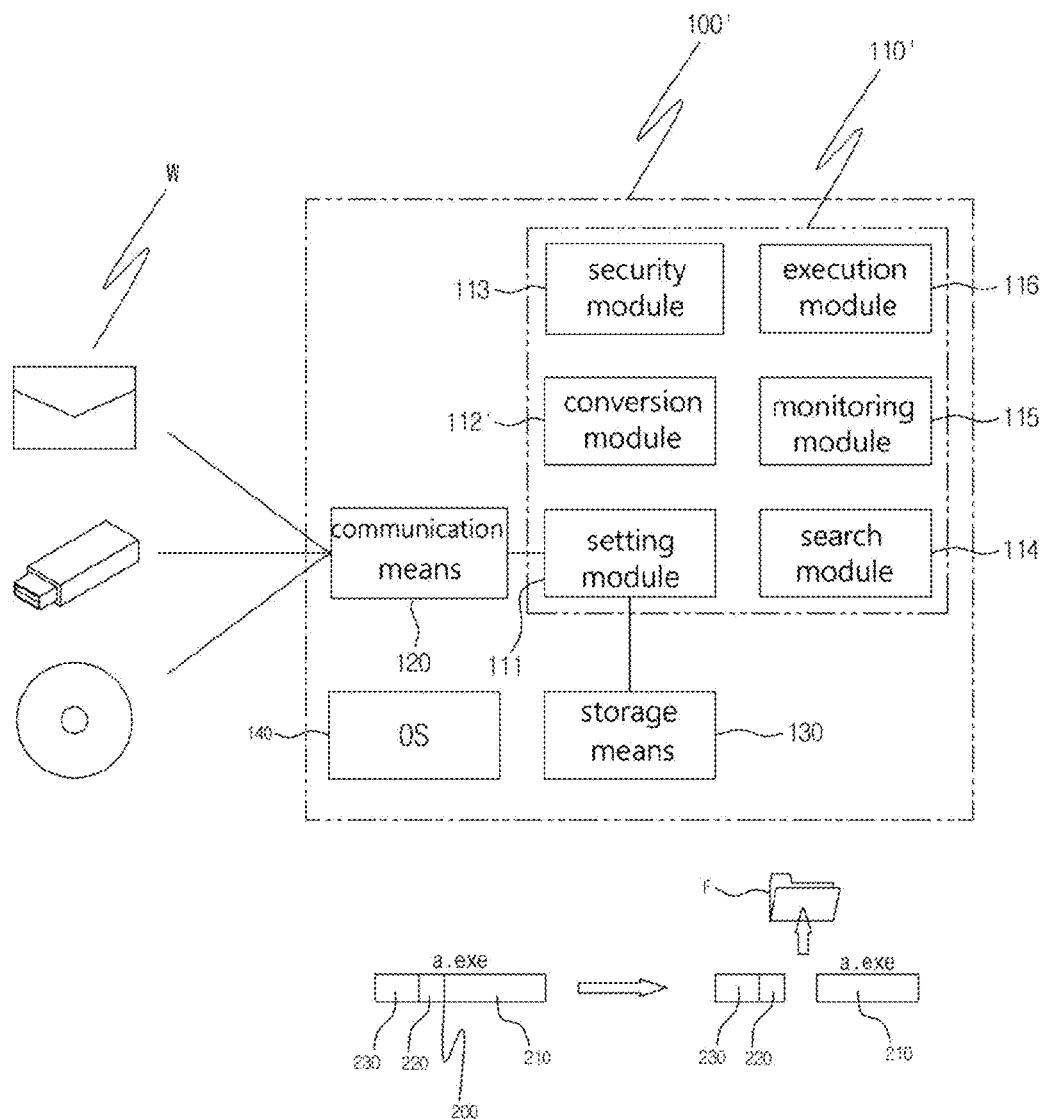
FIG. 5 is a block diagram showing another configuration of a system in which a management apparatus according to the present invention is constructed.

FIG. 5 is a block diagram showing another configuration of a system in which a management apparatus according to the present invention is constructed. The following description will be given with reference to this drawing.

A management apparatus 110' according to the present invention further includes: a monitoring module 115 configured to identify an activity occurring in a specific area when a stub file 200 converted into a type of monitoring target file is executed in a system 100,' and to block the execution and/or issue a warning when the corresponding activity departs from the range of designated activities; and an execution module 116 configured to restore the security-processed stub file 200 to an original executable file, and to perform processing so that the original executable file can be executed.

The monitoring module 115 identifies an activity regarding the generation, editing, etc. of data performed in an area, such as the registry, file I/O, service, window, kernel area drive or the like of a data processing system when the stub file 200 is executed, more specifically when the original executable file configured in the stub file 200 is executed, and forcibly stops the execution or provides notification to the user by outputting a warning window when the execution is unrelated to the corresponding original executable file configured in the stub file 200 or when the execution for which the access or operation of a related application is not unauthorized is detected. The execution that is unrelated to the corresponding original executable file or the execution for which the access or operation of a related application is not unauthorized refers to the performance of an operation, unrelated to the corresponding original executable file or stub file 200, in a specific area by malicious code illegitimately recorded in the original executable file or stub file 200, or a change (generation, modification, deletion, or the like) to an area (a registry, file I/O, a service or the like) that may exert an influence on the operation of the system. For reference, the monitoring module 115 that monitors the activity of malicious code employs well-known, commonly used vaccine program technology, and the corresponding technology includes technology that forcibly stops unauthorized execution or outputs a warning window when the unauthorized execution is detected.

The execution module 116 is passively invoked and executed in response to the execution of the stub file 200, and performs processing so that a security loader 230 configured in the stub file 200 operates according to a program, thereby allowing the stub 210 of the stub file 200 to be restored to an original executable file. That is, the execution module 116 is a component that performs processing so that the security loader 230 is executed according to a set program routine.

The stub file 200 includes: a stub 210 composed of an original executable file; a header 220 configured to have information about a generator having generated the stub file 200 and/or information about a generated system; and a security loader 230 configured to invoke the management apparatus 110' while controlling processing for the execution of the original executable file. The security loader 230, the header 220 and the stub 210 are sequentially arranged in order to be sequentially processed by a corresponding OS and an application 30 so that configuration data can be processed using a streaming method. As a result, the security loader 230 is a type of routine that is programmed to actively provide notification of the execution of the stub file 200 to the management apparatus 110' and to perform a task for restoring the stub 210, i.e., corresponding original data, while operating in conjunction with the execution module 116 configured in the management apparatus 110.' For reference, the execution module 116, i.e., one configuration of the management apparatus 110,' is a device that receives the location of the original executable file restored from the security loader 230 and that performs control so that the original executable file is executed.

A more detailed description of the technology of the management apparatus 110' according to the present invention will be given when a security method is described.

Figure 6:
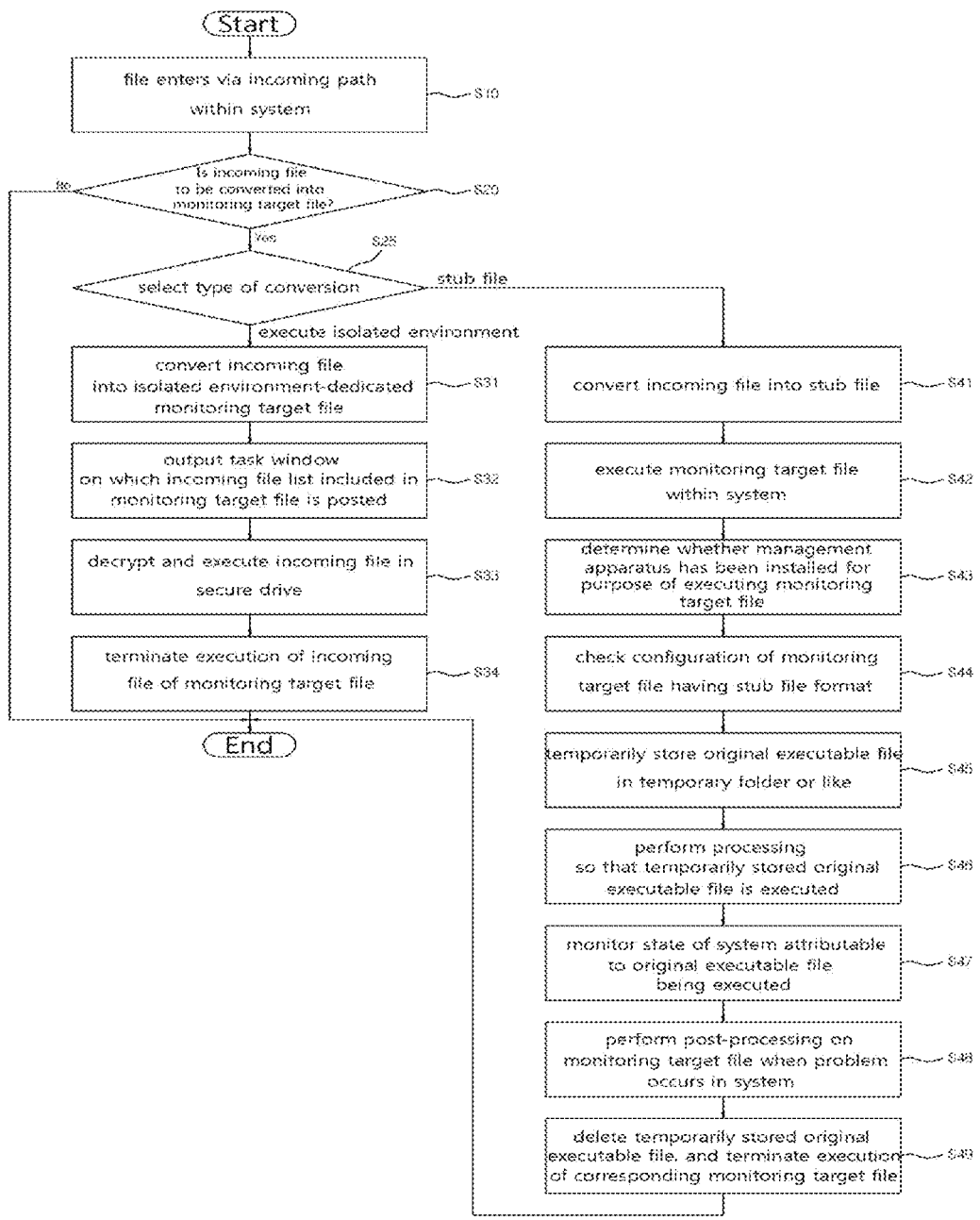
FIG. 6 is a flowchart sequentially showing a second embodiment of a management method according to the present invention.

FIG. 6 is a flowchart sequentially showing a second embodiment of a management method according to the present invention. The following description will be given with reference to this drawing.

Since the file entrance step S10 and the incoming file setting step S20 have been described above, redundant descriptions are omitted here.

S25: Conversion Type Selection Step

Once the user has determined that the incoming file is to be converted, the conversion module 112' determines the conversion type of the incoming file by querying the conversion type. In an embodiment according to the present invention, there are illustrated a first setting scheme for converting an incoming file into a monitoring target file whose execution is limited within the range of an isolated environment, and a second setting scheme for allowing an incoming file to be executed in a general environment and converting the incoming file into a monitoring target file that actively invokes a monitoring module performing real-time monitoring during the execution of the file. Since the monitoring target file related to the first setting scheme has been described above, a redundant description is omitted. The monitoring target file related to the second setting scheme will be described in detail below.

For reference, when the user selects the first setting scheme in response to the query about the conversion type, the conversion module 112' performs processing so that the monitoring target file conversion step S31, the search window output step S32, the incoming file execution step S33, and the incoming file execution termination step S34 can be sequentially performed. In contrast, when the user selects the second setting scheme in response to the query about the conversion type, the conversion module 112' performs processing so that the corresponding incoming file is converted and executed according to the following steps.

S41: Stub File Conversion Step

When the new incoming file is input to the system 100,' the conversion module 112' of the management apparatus 10' inserts the security loader 230, i.e., a type of program routine, into the original executable file, i.e., the incoming file, in order to convert the incoming file into a corresponding monitoring target file, and converts the original executable file into the stub file 200 via the security loader 230.

Figure 7:
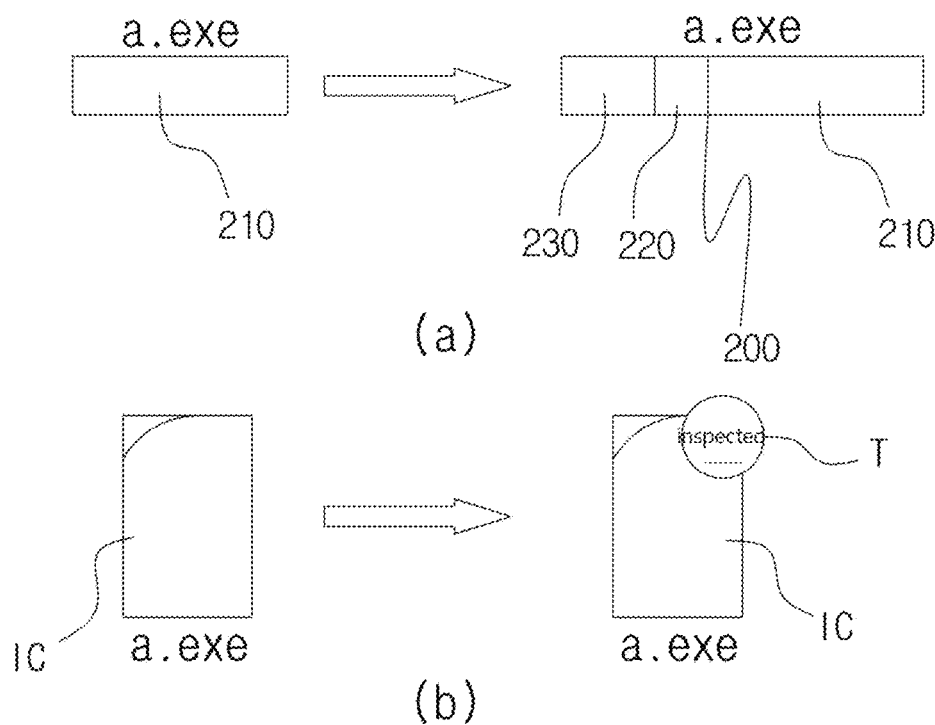
FIG. 7 is a diagram showing the structure of an original executable file converted into a stub file via a management apparatus according to the present invention and the appearance of an icon.

Technology for converting the incoming file into the stub file is more specifically described with reference to FIG. 7 (a diagram showing the structure of the original executable file converted into the stub file via the management apparatus according to the present invention and the appearance of an icon).

The executable file of an application requiring security is present among incoming files. Accordingly, when the corresponding application operates, security must be ensured. For this purpose, it must be monitored in real time whether malicious code is activated during the execution of the executable file of the application. Accordingly, the management apparatus 110' according to the present invention includes the conversion module 112' configured to convert the designated original executable file into the stub file 200.

Meanwhile, among incoming files, a file allows a new program or the like to be executed while additionally generating and executing a subordinate executable file during the execution thereof. As an example, when the user executes an executable file, such as a program installation file, the corresponding executable file additionally generates a subordinate executable file, and allows the subordinate executable file to be automatically executed or allows the user to selectively execute the subordinate executable file.

Accordingly, when a main executable file has been converted into the stub file 200, the conversion module 112' performs processing so that a subordinate executable file, generated during the execution of the corresponding stub file 200, is automatically converted into a stub file.

As shown in FIG. 7(a), the conversion module 112' generates the security loader 230 for conversion into the stub file 200, and inserts the security loader 230 into the front end of the original executable file, i.e., a conversion target, thereby allowing the original executable file to be converted into the stub file 200. As a result, the conversion module 112' disposes the security loader 230 at the front end of the stub 210 corresponding to an original executable file, thereby performing conversion into the stub file 200.

Technology for inserting the security loader into the original executable file will be more specifically described.

Inserting the security loader 230, i.e., a stub program, into an original executable file and combining the security loader 230 with data are all tasks for adding data to an executable file. There are various methods for combining an executable file with data. In an embodiment according to the present invention, the following methods are illustrated.

(1) First Embodiment

The security loader 230 is added to a resource. This method is commonly used during compile time, and is commonly used in the execution module 116 that generates a stub program corresponding to the security loader 230. This method is performed in a form in which an original executable file itself is included as a binary resource and is then loaded and used. When a resource API provided by the Windows is used, the above task can be easily performed. Since the resource is loaded into memory along with the original executable file, the size of the security loader 230 added to the resource is large, and the waste of memory may be incurred when it is not necessary to perform loading at one time.

(2) Second Embodiment

A new section is added to the original executable file, and the security loader 230 is added thereto. This section addition method may be used both during compile time and after compiling. In order to add a section during compile time, #pragma data_seg is used. In order to add a section to the complete stub file 200, a separate utility needs to be generated. The greatest advantage of this method is the addition of executable code. In contrast, since there is no API that is supported, the addition of a section to the already generated stub file 200 has a disadvantage in that direct implementation needs to be implemented. Since the section is also loaded into memory like the resource, the problem of the waste of memory may still remain.

Thereafter, once the conversion into the stub file 200 has been completed, the conversion module 112' stores icon image information, marked with a sign, in the resource of the stub file 200, via which an icon image marked with a sign is posted, thereby enabling the user to identify this image. The stub file 200 is obtained through conversion in order to monitor the original executable file, i.e., a type of executable file. Since the file name thereof is the same as that of the original executable file, the icon image need to be also the same as the icon image of the original executable file. Accordingly, in order to enable the user to identify this, the icon image IC of the stub file 200 obtained through conversion is marked with the sign "inspected" T using a method, such as an overlay method, as shown in FIG. 7(b). Through this, the user may immediately identify the original executable file converted into the stub file 200 while viewing the icon image output into a corresponding folder, through which a safe task environment can be ensured.

S42: Monitoring Target File Execution Step

The corresponding monitoring target file has an executable file format having a Portable Executable (PE) structure such as *.exe, *.dll, or the like. Additionally, file formats having various extensions may be applied.

For reference, since the name of the stub file 200, i.e., the target of the present invention, is stored the same as the name of the original executable file, an operating system (OS) 140 or an application that executes the original executable file determines the stub file 200 recognized as a monitoring target file to be the corresponding original executable file, and executes the stub file 200. Accordingly, when the original executable file is "a.exe," the stub file 200 is converted into "a.exe" and stored, and thus the OS 140 or corresponding application executes the stub file 200 converted into and stored as "a.exe" at the timing when the corresponding monitoring target file must be processed.

Thereafter, the information recorded in the monitoring target file is sequentially processed by the OS 140 or application using a streaming method. Accordingly, when the monitoring target file is the stub file 200, the OS 140 or application processes the security loader 230, the header 220 and the stub 210, i.e., the information recorded in the stub file 200, in order of storage.

S43: Management Apparatus Installation Checking Step

The security loader 230 is identified during the processing process of the OS 140 or application, and the security loader 230 invokes the management apparatus 110' while operating in accordance with settings.

In contrast, when the monitoring target file is a general executable file other than the stub file 200 security processed according to the present invention, the security loader 230 is not configured in the corresponding executable file. Accordingly, the management apparatus 110' is not invoked during the processing process of the OS 140 or application, and the stub 210 of the executable file is directly executed by the corresponding application.

For reference, when the stub file 200 is executed in the system 100' in which the management apparatus 110' according to the present invention is not installed, the security loader 230 of the stub file 200 does not have an invocation target, and thus a subsequent process is not performed. As a result, the execution of the monitoring target file is fundamentally blocked in a system in which the management apparatus 110' is not installed, and thus the effect of maximizing security is achieved.

S44: Target File Checking Step

The security loader 230, i.e., a type of program routine, checks the first full information of the stub file 200 used to determine a location, and checks the sizes of the security loader 230, the header 220 and the stub 210 configured in the stub file 200. Since the stub file 200 is an independent file that may be moved to and executed at various locations according to the intension of the user, it is not fixedly placed at a specific limited location. Accordingly, the security loader 230 checks its on location, size and the like whenever the stub file 200 is executed. For reference, the full path is generated by designating and inputting all directory names starting with a drive name when designating a file name, and is well-known, commonly used information used to determine the absolute location of a file.

The stub 210 corresponds to an original executable file section, and the original executable file section may be encrypted during the conversion into the stub file 200. As a result, when the original executable file has been converted into the stub file 200, effects may be achieved in that the activation of malicious code is fundamentally blocked during execution and also the data of the original executable file is prevented from being illegitimately divulged, due to the encryption of the original executable file.

S45: Target File Information Storage Step

The security loader 230 separately stores the original executable file of the stub 210 in a temporary folder F, checks second full path information, i.e., the location of the corresponding temporary folder F, and transfers the second full path information, together with the first full path information, to the execution module 116 of the management apparatus 110.'

For reference, when the original executable file of the stub 210 is encrypted, the security loader 230 may decrypt the encrypted original executable file and then store the decrypted original executable file in the temporary folder F, or the security loader 230 may store the encrypted original executable file in the temporary folder F first and then the execution module 116 may decrypt the encrypted original executable file immediately before the execution of the corresponding original executable file.

S46: Original Executable File Execution Step

The execution module 116 of the management apparatus 110' invoked by the security loader 230 receives the second full path information from the security loader 230, and the execution module 116 performs processing so that the original executable file corresponding to the second full path information is executed.

The original executable file initiates unique corresponding execution under the control of the execution module 116, and an application operating in conjunction with the original executable file initiates its execution.

S47: Original Executable File Monitoring Step

The monitoring module 115 of the management apparatus 110' identifies the original executable file within the temporary folder F based on the first and second full path information transmitted by the security loader 230. When the original executable file is executed, the monitoring module 115 determines whether malicious code is present or an unauthorized activity has occurred by checking all data generate and edited in the areas, such as the registries, file I/O, services, windows, kernel area drives, etc., of the system 100.'

The monitoring module 115 has information about execution that is performed after the execution of the original executable file. Accordingly, when execution, other than the designated execution, is performed after the execution of the original executable file, the monitoring module 115 considers malicious code or an unauthorized activity to have occurred, and performs the post-processing of the system 100' in a corresponding area.

S48: Monitoring Target Post-Processing Step

When it is determined that malicious code or an unauthorized activity has occurred in the corresponding area of the system 100,' the monitoring module 115 may stop the corresponding execution of the system 100,' or may output a warning window to the user, thereby allowing follow-up measures to be taken.

Examples of the post-processing of the monitoring module 115 may include the checking of an attempt for a change to an area (a MBR or the like) required for OS booting (file monitoring), the checking of an unnecessary change to a registry value in a kernel level, other than a general user level (registry monitoring), and the generation or editing of data, such as the storage of the log of a portion that blocks or requests access.

As described above, the monitoring module 115 may be a well-known, widely used device for limiting the execution of malicious code or an unauthorized activity.

Meanwhile, the stub file 200 includes the header 220. The monitoring module 115 determines the header information of the stub file 200 in the header 220. The header information includes information about a generator that generated the stub file 200 and/or information about a location where the stub file 200 was generated, a file incoming path (hereinafter "file incoming path information"), etc. Security measures, such as the control of the execution of the stub file 200 or deletion, may be taken based on the header information.

More specifically, the monitoring module 115 queries information about the file incoming path W of the corresponding stub file 200 (for example, the mail address of a sender who sent the file, a URL address to which the file was downloaded, the name of a USB device which includes the file, or the like) based on the header information of the stub file 200 at the original executable file monitoring step S47. When the retrieved information about the file incoming path W indicates that malicious code is executed or an unauthorized activity is performed and thus corresponds to an unauthorized entrance path in terms of policies, processing may be performed such that the execution of the corresponding original executable file is blocked or the stub file 200 is deleted. Furthermore, in order to block the corresponding file incoming path itself, post-processing that limits the execution of other stub files having the information about the file incoming path W may be performed.

S49: Monitoring Target File Termination Step

Once the execution of the corresponding monitoring target file has been terminated, the execution module 116 deletes the temporary folder F or original executable file in which the original executable file has been temporarily stored.

Figure 8:
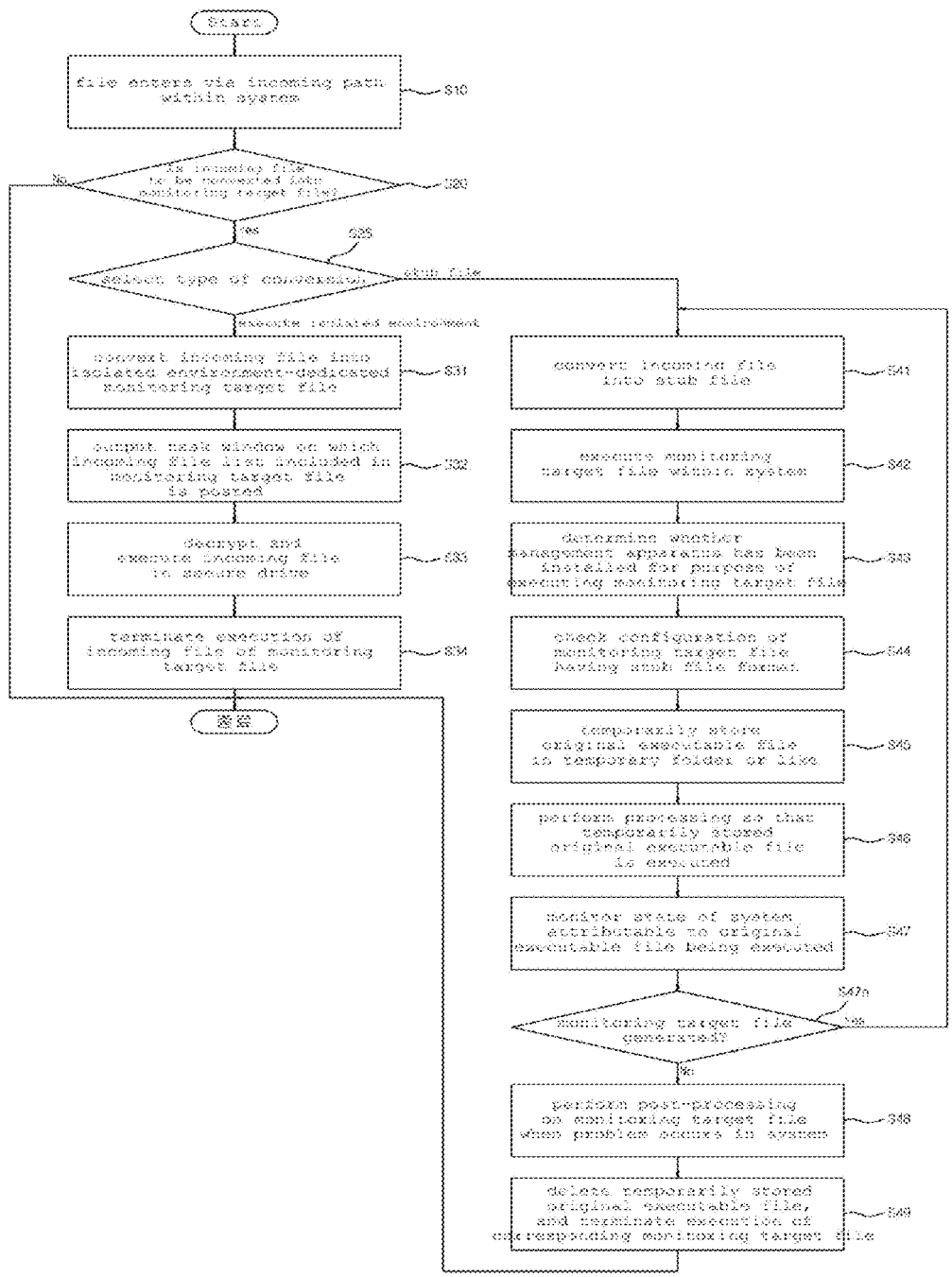
FIG. 8 is a flowchart sequentially showing a third embodiment of a management method according to the present invention.

FIG. 8 is a flowchart sequentially showing a third embodiment of a management method according to the present invention. The following description will be given with reference to this drawing.

S47a: Executable File Generation Determination Step

The conversion module 112' of the management apparatus 10' determines whether a new monitoring target file has been generated when the original executable file is executed. As described above, the monitoring target file includes a file that generates a new executable file that is not present, such as an installation file. The conversion module 112' determines whether a new executable file that is not present has been generated, and performs the stub file conversion step S41.

It will be apparent that when it is determined that there is no newly generated executable file, the monitoring of the execution of the original executable file is resumed or the termination of the monitoring target file is performed.

Although the above description has been given with reference to the preferred embodiments of the present invention in the above detailed description of the present invention, it will be understood by those skilled in the corresponding technical field or those having ordinary knowledge in the corresponding technical field that the present invention may be modified and altered in various manners within the range that does not depart from the spirit and technical scope of the present invention that are described in the following claims.

The invention claimed is:

1. A file security management method for protection of a system, the method comprising:
a monitoring target file conversion step of, when a management apparatus identifies reception of an incoming file at a system, generating, by the management apparatus, an isolated drive in a virtual operation environment which is separated from an actual operation environment of the system and which blocks exit of file data to an outside, setting, by the management apparatus, a monitoring target ID for the incoming file based on an incoming path, encrypting, by the management apparatus, the incoming file, converting, by the management apparatus, the incoming file into a monitoring target file, and storing, by the management apparatus, the monitoring target file:
a search window output step of outputting, by the management apparatus, the incoming file converted into the monitoring target file to a search window:
an incoming file execution step of, when the management apparatus identifies a command to execute the monitoring target file, decrypting, by the management apparatus, the monitoring target file, storing, by the management apparatus, the corresponding incoming file on the isolated drive, and performing, by the management apparatus, control so that an application program authorized for the isolated drive executes the incoming file in the virtual operation environment:
a monitoring step of, when the management apparatus identifies execution of malicious code or an unauthorized operation in the system after the execution of the incoming file, stopping, by the management apparatus, execution of a monitoring target file having entered via the incoming path of the monitoring target ID, and outputting, by the management apparatus, a warning window; and
a termination step of, when the management apparatus identifies a stopping of the execution of the incoming file, converting, by the management apparatus, the incoming file into a monitoring target file, and deleting, by the management apparatus, the remaining file of the isolated drive.

2. The file security management method of claim 1, wherein the monitoring target file conversion step further comprises a step of identifying an incoming path of the incoming file and then setting at least one, selected from a USB drive, a CD drive and a DVD drive, as the isolated drive when the corresponding incoming path is the at least one selected drive.

* * * * *